(12) United States Patent
Iwahori et al.

(10) Patent No.: US 8,076,897 B2
(45) Date of Patent: Dec. 13, 2011

(54) AC MOTOR DRIVING CIRCUIT AND ELECTRIC VEHICLE DRIVING CIRCUIT

(75) Inventors: Michio Iwahori, Hino (JP); Masakazu Gekinozu, Matsumoto (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 387 days.

(21) Appl. No.: 12/453,486

(22) Filed: May 12, 2009

(65) Prior Publication Data

US 2009/0284200 A1    Nov. 19, 2009

(30) Foreign Application Priority Data

May 13, 2008    (JP) .................. 2008-126042

(51) Int. Cl.
*H02P 27/04*    (2006.01)
(52) U.S. Cl. ...................... 318/801; 318/800
(58) Field of Classification Search .............. 318/767, 318/800, 801
See application file for complete search history.

(56) References Cited

U.S. PATENT DOCUMENTS

| | | | | |
|---|---|---|---|---|
| 7,122,991 | B2 * | 10/2006 | Kitajima et al. | 318/800 |
| 7,439,704 | B2 * | 10/2008 | Nojima et al. | 318/801 |
| 7,459,877 | B2 * | 12/2008 | Cook | 318/778 |
| 2005/0062023 | A1 | 3/2005 | Korzhenko et al. | |
| 2007/0216339 | A1 * | 9/2007 | Yoshimoto et al. | 318/800 |
| 2007/0274109 | A1 | 11/2007 | Oyobe et al. | |
| 2008/0031019 | A1 * | 2/2008 | Alexander | 363/37 |
| 2010/0109585 | A1 * | 5/2010 | Iwahori et al. | 318/400.3 |
| 2010/0109587 | A1 * | 5/2010 | Iwahori et al. | 318/400.09 |

FOREIGN PATENT DOCUMENTS

| | | | | |
|---|---|---|---|---|
| JP | 58-159694 A | * | 9/1983 | 318/801 |
| JP | 2004-112883 | | 4/2004 | |
| JP | 2004-222337 | | 8/2004 | |
| JP | 2005-318731 | | 11/2005 | |

OTHER PUBLICATIONS

S. Katsuji et al., "Technical Trends of Direct AC/AC Convertes", IEEJ Trans. IA, vol. 126, No. 9, 2006, pp. 1161-1170.

* cited by examiner

*Primary Examiner* — Thomas Dougherty
(74) *Attorney, Agent, or Firm* — Rabin & Berdo, P.C.

(57) ABSTRACT

In an AC motor driving circuit, a current source rectifier is provided on the output side of an AC generator and an AC motor is connected to the output side of the current source rectifier through a voltage source inverter. Along with this, one of terminals of each of a plurality of bidirectional switches is connected to its corresponding output terminal of the voltage source inverter, the other terminals of a plurality of the bidirectional switches are lumped together to be connected to one of terminals of a storage battery, and the other terminal of the storage battery is connected to one of DC input terminals of the voltage source inverter. This eliminates need for a large capacitor at a DC link and a reactor in a chopper which were previously necessary, by which the AC motor driving circuit is downsized.

10 Claims, 11 Drawing Sheets

AC MOTOR DRIVING CIRCUIT AND ELECTRIC VEHICLE DRIVING CIRCUIT

CROSS-REFERENCE TO RELATED APPLICATION

This application claims priority to and the benefit of Japanese Patent Application No. 2008-126042, filed May 13, 2008, the disclosure of which is incorporated herein by reference in its entirety.

BACKGROUND

1. Field of the Invention

The invention relates to an AC motor driving circuit for driving an AC motor by using an AC generator and a DC power source including a storage battery and a capacitor, and to an electric vehicle driving circuit using the AC motor driving circuit.

2. Description of the Related Art

For an AC motor driving circuit of this kind, there is previously known a circuit as shown in FIG. 11(see JP-A-2004-112883, for example). FIG. 11 is a circuit diagram showing a first example of a related AC motor driving circuit. In the circuit, a three-phase AC output of an AC generator M2 is converted to a DC output by a voltage source rectifier circuit 31 formed of a bridge circuit with a switching device and a diode connected in inverse parallel therewith as each of six arms. The DC output is smoothed by a capacitor 13 connected at a DC link (connection points N1 and N2). The smoothed DC output is transferred to a battery B from the DC link, to which the DC output from the battery B also is inputted. Moreover, between the DC link and the battery B, a DC chopper 12, formed of a reactor L1 and switching devices Q1 and Q2 paired with their respective corresponding diodes D1 and D26, is provided for carrying out DC voltage conversion for supplying DC electric power from the DC link to the battery B, and conversely, supplying DC electric power from the battery B to the DC link. Furthermore, the above DC electric power inputted to the DC link is converted to AC output by a voltage source inverter 14 formed of a bridge circuit with each of switching devices Q3 to Q8 paired with their respective corresponding diodes D3 to D8 connected in inverse parallel therewith as each of six arms. With the converted AC electric power, an AC motor M1 is driven. A control apparatus 30 controls the AC motor driving circuit based on torque instruction values (TR1 and TR2) and motor rotation numbers (MRN1 and MRN2).

An example of a circuit that directly converts an output of an AC generator to an AC output with a different frequency and feeds the converted output to an AC motor, a circuit shown in FIG. 12 is also known (see JP-A-2005-318731, for example). FIG. 12 is a circuit diagram showing a second example of a related AC motor driving circuit. In the circuit, an electric power conversion between motor-generators MG1 and MG2 is actualized with the use of a matrix converter 38, which is composed of nine switches arranged as a three by three switch matrix (switches SAa to SCc). Moreover, for exchanging electric power between a battery 12 and the motor-generators MG1 and MG2, a voltage source inverter 36 and a DC chopper 32 are provided. The voltage source inverter 36 is formed of a bridge circuit with each of switching devices Q31 to Q36 paired with their respective corresponding diodes D31 to D36 connected in inverse parallel therewith as each of six arms. The six arms are composed of two U-phase bridge arms 36U, two V-phase bridge arms 36V, and two W-phase bridge arms 36W. The DC chopper 32 is formed of a reactor L and switching devices Q11 and Q12 paired with their respective corresponding diodes D11 and D12. A control apparatus 40 controls the AC motor driving circuit based on control signal from a controller 48.

In the circuit shown in FIG. 11, the capacitor 13 for smoothing the DC output is required to have a large capacitance, which makes downsizing of the circuit difficult. Moreover, the reactor L1 is required in the DC chopper 12. In this respect, there is also a problem of enlarging the circuit. Furthermore, in the circuit shown in FIG. 12, a large DC capacitor C2 is also required between the battery 12 and the motor-generator MG2, which again makes downsizing of the circuit difficult. Moreover, the reactor L is required in the DC chopper 32. In this respect, again there is a problem of enlarging the circuit.

Furthermore, it is known that a combination of a current source rectifier and a voltage source inverter is used in a system called an indirect matrix converter, which is disclosed in the publication "Technical Trends of Direct AC/AC Converters", IEEEJ Transactions on Industry Applications, vol. 126-D, No. 9, pp. 1161-1170, September 2006 (in Japanese). This publication describes the use of a current source rectifier and a voltage source inverter to allow large-sized parts such as the capacitor 13 shown in FIG. 11 to be omitted.

Accordingly, it is an object of the invention to eliminate the need for a DC capacitor and a reactor in a DC chopper from an AC motor driving circuit such as the above and to downsize the driving circuit.

SUMMARY OF THE INVENTION

For solving the foregoing problems and achieving this object, in a first aspect of the invention an AC motor driving circuit for driving an AC motor includes a current source rectifier having an AC input, a voltage source inverter having a DC input, provided between the current source rectifier and an AC motor, through which inverter the AC motor is connected to the output side of the current source rectifier, and a plurality of switches each with one of the terminals thereof connected to the corresponding output terminal of the voltage source inverter. In the driving circuit, the other terminals of a plurality of the bidirectional switches are lumped together to be connected to one of two terminals of the DC power source, and the other of the two terminals of the DC power source is connected to one of the DC input terminals of the voltage source inverter.

As a second aspect of the invention, in the AC motor driving circuit according to the first aspect of the invention, the current source rectifier can be formed with a plurality of bidirectional switches connected as arms of a bridge circuit, and can be provided with a filter circuit on the AC input side. In the AC motor driving circuit according to the first aspect of the invention, as a third aspect of the invention, the current source rectifier can be formed with a plurality of unidirectional switches each having a reverse blocking capability connected as arms of a bridge circuit and can be provided with a filter circuit on the AC input side. As a fourth aspect of the invention, an electric vehicle driving circuit using the AC motor driving circuit according to the first aspect of the invention can be provided in which the AC input is an AC generator driven by an internal combustion engine.

In a fifth aspect of the invention, in the AC motor driving circuit according to the first aspect of the invention, a plurality of bidirectional switches can be used for the switch. As a sixth aspect of the invention, in the AC motor driving circuit according to the fifth aspect of the invention, a switching device and a diode in inverse-parallel connection therewith can be used for each of the bidirectional switches. In the AC motor driving circuit according to the fifth aspect of the invention, as a seventh aspect of the invention, the current source rectifier can be formed with a plurality of bidirectional switches connected as arms of a bridge circuit and can be provided with a filter circuit on the AC input side, or in the AC motor driving circuit according to the fifth aspect of the invention, as an eighth aspect of the invention, the current source rectifier can be formed with a plurality of unidirectional switches each having a reverse blocking capability connected as arms of a bridge circuit and can be provided with a filter circuit on the AC input side. In the AC motor driving circuit according to the sixth aspect of the invention, as a ninth aspect of the invention, the current source rectifier can be formed with a plurality of bidirectional switches connected as arms of a bridge circuit and can be provided with a filter circuit on the AC input side, or in the AC motor driving circuit according to the sixth aspect of the invention, as a tenth aspect, the current source rectifier can be formed with a plurality of unidirectional switches each having a reverse blocking capability connected as arms of a bridge circuit and can be provided with a filter circuit on the AC input side.

As an eleventh aspect of the invention, there is provided a method of driving an AC motor. The method includes generating AC electric power from an AC generator, rectifying the AC electric power to deliver DC output using a current source rectifier, inverting the DC output from the current source rectifier to first AC output using a first voltage source inverter, inverting DC electric power from a DC power source to second AC output using a second voltage source inverter; supplying the first AC output to an AC motor, and supplying the second AC output to the AC motor. In the method for driving an AC motor, according to the eleventh aspect of the invention, as a twelfth aspect of the invention, the power supplies of the first AC output and the second AC output can be time-division switched.

As a thirteenth aspect of the present invention, there is provided a method of performing a regenerative operation for an AC motor driving circuit. The method includes generating AC electric power from a braked AC motor, rectifying the AC electric power to deliver first DC output using a first voltage source inverter to operate as a rectifier, and transferring the first DC output to a DC storage battery from the first voltage inverter. The method of performing a regenerative operation for an AC motor driving circuit according to the thirteenth aspect of the invention, as a fourteenth aspect of the invention, can include rectifying the AC electric power to deliver second DC output using a second voltage source inverter to operate as a rectifier, inverting the second DC output from the second voltage source inverter to AC output using a current source rectifier to operate as an inverter, and transferring the AC output to an AC generator from the current source rectifier. In the method according to the fourteenth aspect of the invention, as a fifteenth aspect of the invention, the power transfers to the DC storage battery and the AC generator can be time-division switched. In the method according to the fourteenth aspect of the invention, as a sixteenth aspect of the invention, the power transfers to the DC storage battery and the AC generator and can be simultaneously performed.

As a seventeenth aspect of the invention, there is provided a method of performing a regenerative operation for an AC motor driving circuit. The method includes: generating AC electric power from a braked AC motor, rectifying the AC electric power to deliver DC output using a voltage source inverter to operate as a rectifier, inverting the DC output from the voltage source inverter to AC output using a current source rectifier to operate as an inverter, and transferring the AC output to an AC generator from the current source rectifier.

According to the invention, in an AC motor driving circuit, the use of a direct converter circuit by using the current source rectifier for the rectifier circuit and the voltage source inverter for the inverter allows an electric power conversion between an AC generator and an AC motor to be carried out without providing a large capacitor at a DC link at which DC electric power is inputted and outputted. Moreover, one of the terminals of the bidirectional switch is connected to each of the output terminals of the voltage source inverter, the other terminal of the bidirectional switch is connected to one of the terminals of the DC power source, and the other terminal of the DC power source is connected to one of the DC input terminals of the voltage source inverter. With this, by the bidirectional switches and the upper or the lower arms of the voltage source inverter, the voltage source inverter can have the DC power source provided on the input side and have the AC motor provided on the output side.

In the above configuration, with the operation of the rectifier circuit being stopped and all of the switching devices in the upper or the lower arms that form the voltage source inverter together with the bidirectional switches, being turned-off, the operation of the voltage source inverter including the rest of the lower or the upper arms and the bidirectional switches enables bidirectional electric power exchange between the DC power source and the AC motor. Such a configuration of the converting circuit, capable of carrying out both of an electric power supply with the output electric power from the AC generator and an electric power supply from the DC power source, enables the driving of the AC motor with the use of both of the above kinds of electric power by carrying out time-division switching of the above power supplies. Moreover, either by stopping the operation of the rectifier circuit and turning off all of the switching devices in the upper or the lower arms that form the voltage source inverter with the bidirectional switches, or by operating the rectifier circuit with all of the bidirectional switches turned-off, the AC motor can be driven with the output electric power supplied from only one of the DC power source and the AC generator.

Furthermore, in the case of operating the AC motor as a brake, in the same way as above, the electric power generated in the AC motor can be transferred to at least one of the AC generator and the DC power source to make the AC motor carry out a regenerative operation. In the configuration, neither the large capacitor at the DC link in each of the examples of the related driving circuits nor the large reactor (the reactor L1 in FIG. 11 and the reactor L in FIG. 12) required in each of the choppers in the examples of the related driving circuits is necessary. This makes it possible to provide the driving circuit at a reduced cost with reduced size and weight.

In the above configuration, when the voltage of the DC power source is always higher than the output voltage of the current source rectifier, through the whole period including a period in which electric power is supplied from the current source rectifier, the polarity of the voltage applied to the bidirectional switch is always kept the same. Even though the bidirectional switch is substituted with a switching device and a diode in inverse parallel connection thereto, the same operation as that when the bidirectional switch is used is possible, so that the bidirectional switch can be simplified.

By using a circuit in which the current source rectifier has a filter circuit on the AC input side and a bridge circuit on the output side, with the bidirectional switching devices connected as the arms, in the case when the AC motor driving circuit is used for a regenerative operation of transmitting electric power generated in the AC motor to the AC generator, the regenerative operation can be actualized with a simple circuit configuration. In this case, the number of devices in the current path is as small as two in the rectifier circuit, so that high conversion efficiency also is obtained. Moreover, by using a circuit in which the current source rectifier has a filter circuit on the AC input side and a bridge circuit on the output side, with the unidirectional switching devices, each having a reverse blocking capability, connected as the arms, in the case when the AC motor driving circuit is used for non-regenerative operation and transmits no electric power generated by braking the AC motor to the AC generator, the circuit configuration can be made simpler.

A driving circuit for an electric vehicle such as a hybrid vehicle is required to occupy a limited space. The use of the circuit according to the invention necessitates neither a large capacitor nor a large reactor. Therefore, it becomes possible for an electric vehicle to have a driving circuit mounted in such a limited space to enable a motor and a generator to output higher power, which can enhance acceleration and deceleration performance of the electric vehicle.

DESCRIPTION OF THE PREFERRED EMBODIMENT

Figure 1:
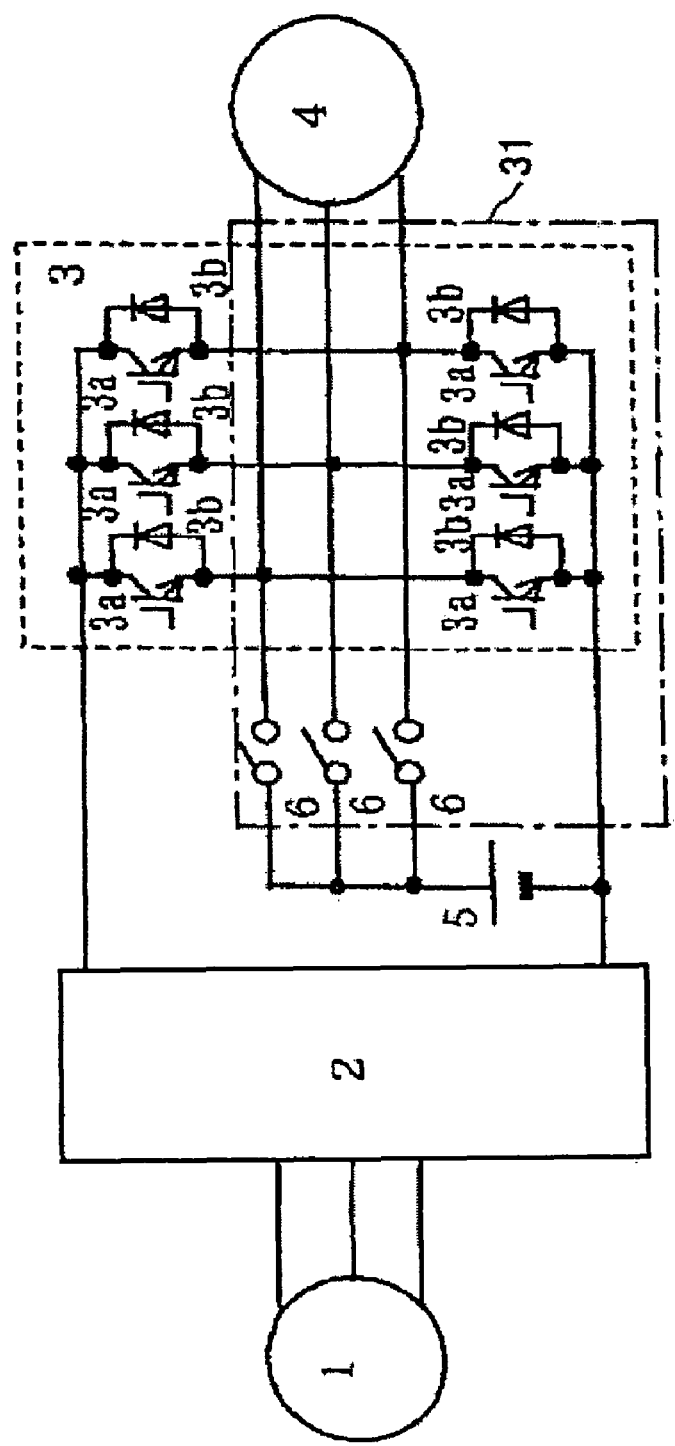
FIG. 1 is a circuit diagram showing an embodiment of an AC motor driving circuit according to the invention.

FIG. 1 is a circuit diagram showing an embodiment of an AC motor driving circuit according to the invention.

As is shown in FIG. 1, in the embodiment, to the output side of a three-phase AC generator 1, a current source rectifier 2 is connected, on the output side of which a first voltage source inverter 3 is provided to be connected thereto through a pair of positive and negative DC input terminals. On the output side of the first voltage source inverter 3, with the three-phase AC output thereof, variable-speed driving of a three-phase AC motor 4 is carried out. To each of the three-phase AC output terminals of the first voltage source inverter 3, one of terminals of a bidirectional switch 6 is connected, the other terminal of which is connected to the positive terminal of a storage battery 5. The negative terminal of the storage battery 5 is connected to the negative DC input terminal of the first voltage source inverter 3. For the storage battery 5, there can be used a capacitor or a DC power source system which is connected to a storage battery or a capacitor through a DC to DC converter such as a DC chopper capable of bidirectional power conversion.

With the configuration shown in FIG. 1, the electric power conversion between the AC output of the AC generator 1 and the AC input to the AC motor 4 is actualized by once converting the AC output of the AC generator 1 into a DC output with the current source rectifier 2 before converting the DC output into an AC output with the first voltage source inverter 3. Moreover, in FIG. 1, the section surrounded by a dot-dash line is a second voltage source inverter 31 formed with the three bidirectional switches 6 and three lower arms of the first voltage source inverter 3 (one arm is formed with a switching device 3a and a diode 3b connected in inverse parallel therewith). The second voltage source inverter 31 has the output of the storage battery 5 as its DC input and, with its output, carries out variable-speed driving of the AC motor 4.

Therefore, AC electric power can be supplied to the AC motor 4 by first converting the AC electric power from the AC generator 1 to DC electric power and then converting this DC electric power to the AC power delivered to the AC motor as first electric power, using the first voltage source inverter 3. AC power also can be supplied to AC motor 4 as second electric power by converting DC electric power supplied from the storage battery 5 to AC electric power using the second voltage source inverter 31. In this case, a time-division operation carried out by alternately switching the operations of the first voltage source inverter 3 and the second voltage inverter 31 allows the first electric power and the second electric power to be supplied to the AC motor 4.

Moreover, with operation of the current source rectifier 2 stopped and all of the three switching devices 3a in the upper arms of the first voltage source inverter 3 turned-off, the variable-speed driving of the AC motor 4 also can be carried out with only the AC electric power to which the DC electric power supplied from the storage battery 5 is converted by the second voltage source inverter 31 (the second electric power). In the same way, by operating the first voltage source inverter 3 with all of the bidirectional switches 6 remaining off, the AC motor 4 can be driven with only the AC electric power to which AC electric power from the AC generator 1 is converted to DC electric power through the voltage source rectifier circuit 2 and the DC electric power is again converted by the first voltage source inverter 3 (the first electric power).

Furthermore, also in braking the AC motor 4, a regenerative operation can be carried out with a first mode in which the AC electric power generated in the AC motor 4 operated as a generator is transferred only to the AC generator 1 with the first voltage source inverter 3 being operated as a rectifier and the current source rectifier 2 further being operated as an inverter in the same way as above. In addition, there is a second regenerative operation mode in which the AC electric power generated in the AC motor 4 is transferred only to the storage battery 5 with the second voltage source inverter 31 being operated as a rectifier, or a third regenerative operation mode in which the AC electric power generated in the AC motor 4 is transferred to both of the AC generator 1 and the storage battery 5. The AC electric power generated in the AC motor 4 can be transferred with any one of the three regenerative operation modes.

Figure 2:
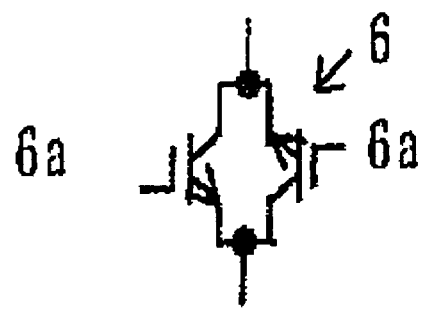
FIG. 2 is a circuit diagram showing a first specific example of the bidirectional switch used in the driving circuit shown in FIG. 1.
Figure 3:
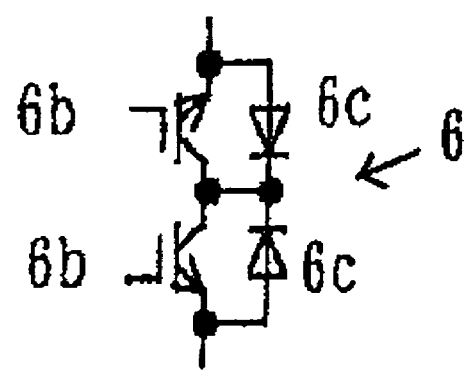
FIG. 3 is a circuit diagram showing a second specific example of the bidirectional switch used in the driving circuit shown in FIG. 1.

The bidirectional switch 6 can be specifically formed as shown in FIG. 2 by using, for example, switching devices 6a each having reverse blocking ability in itself. Moreover, when using switching devices 6b each having no reverse blocking ability in itself, the bidirectional switch 6 can be specifically formed as shown in FIG. 3 by additionally using diodes 6c.

Figure 4:
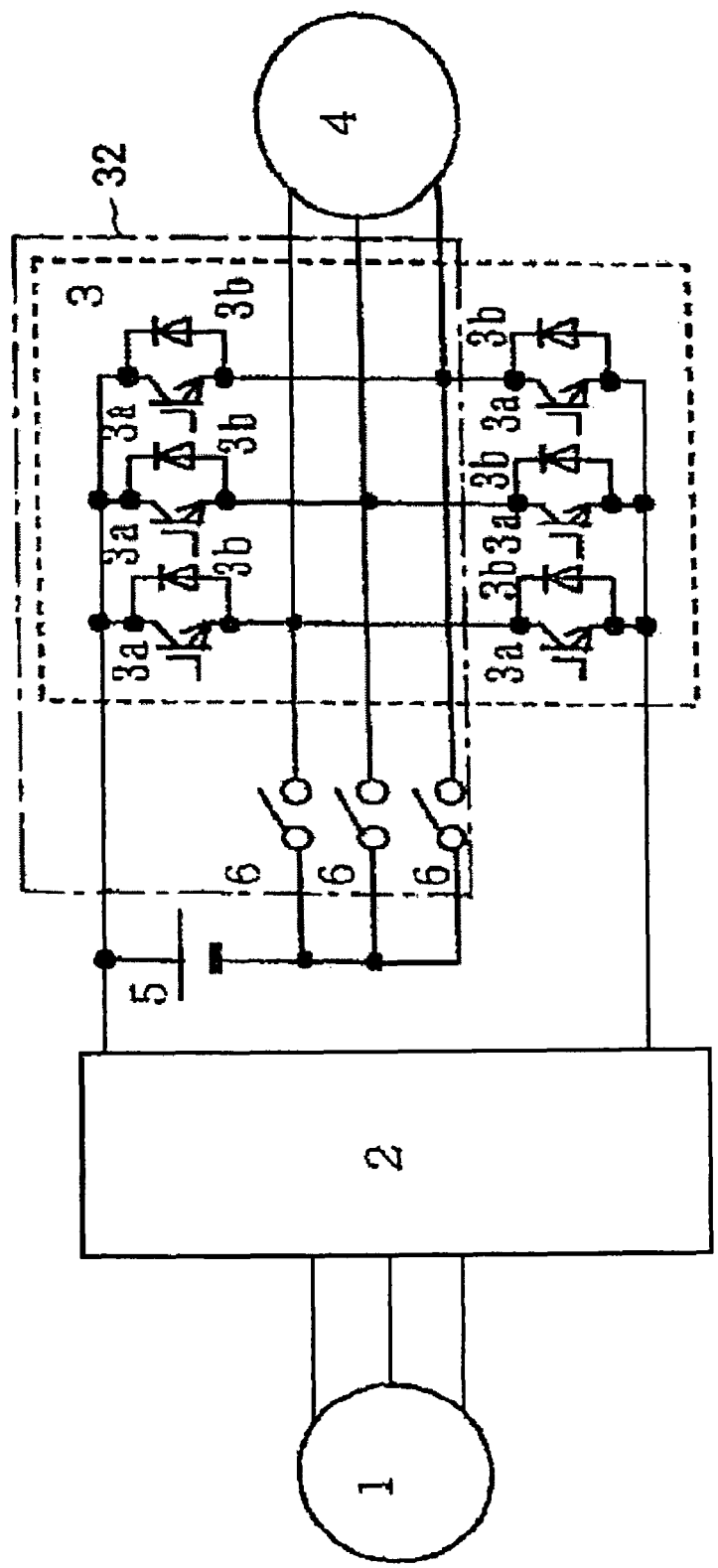
FIG. 4 is a circuit diagram showing an example of a first modification of the AC motor driving circuit shown in FIG. 1.

FIG. 4 is a circuit diagram showing an example of a first modification of the AC motor driving circuit shown in FIG. 1. As shown in FIG. 4, the configuration of the driving circuit differs from that shown in FIG. 1 in that the bidirectional switches 6 are connected to the negative terminal of the storage battery 5 and the positive terminal of the storage battery 5 is connected to the positive terminal of the DC input terminals of the first voltage source inverter 3. In FIG. 4, the section surrounded by a dot-dash line is a third voltage source inverter 32 formed with the three bidirectional switches 6 and three upper arms of the first voltage source inverter 3. The third voltage source inverter 32 has the DC output of the storage battery 5 as its DC input and, with its output, carries out variable-speed driving of the AC motor 4. This allows the circuit to be operated similarly to the operation of the circuit shown in FIG. 1.

Figure 5:
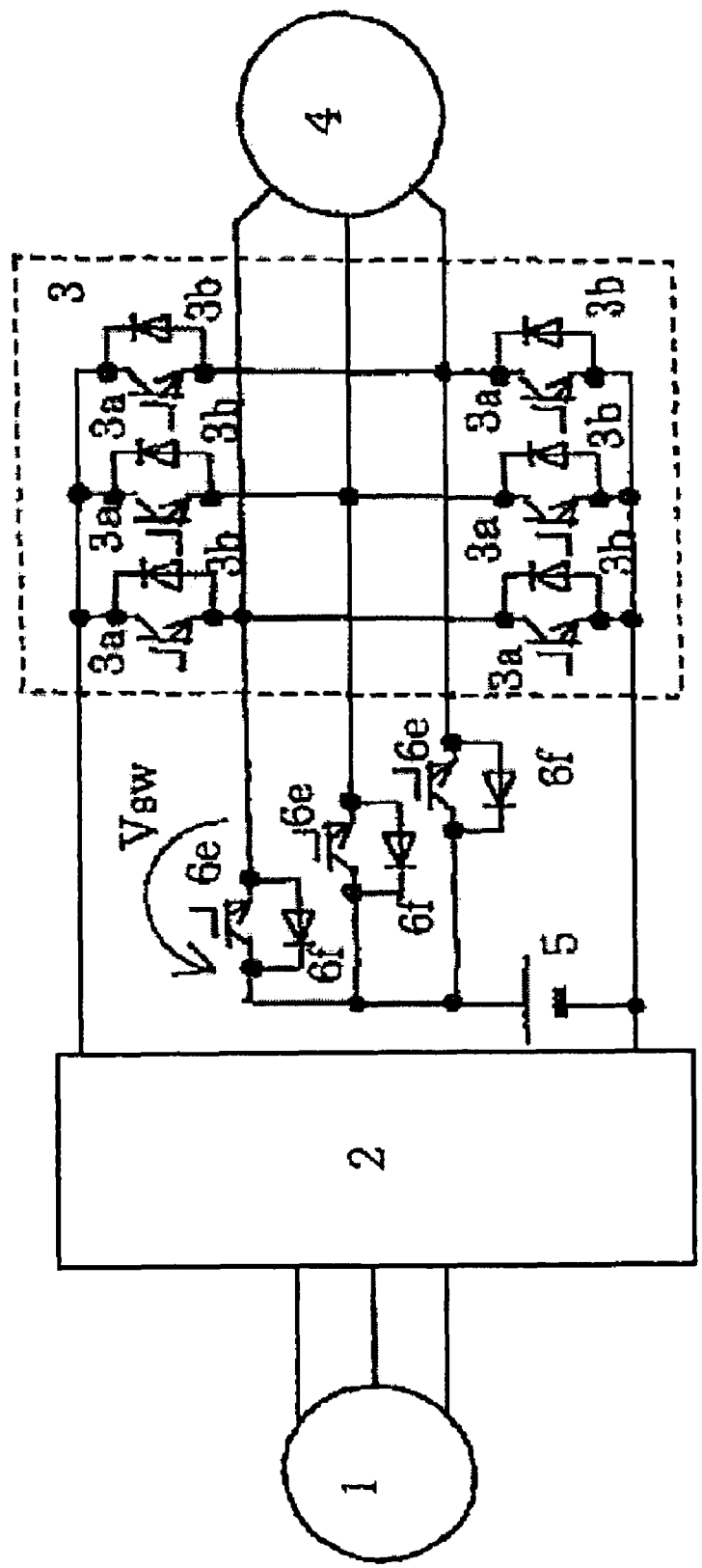
FIG. 5 is a circuit diagram showing an example of a second modification of the AC motor driving circuit shown in FIG. 1.

FIG. 5 is a circuit diagram showing an example of a second modification of the AC motor driving circuit shown in FIG. 1. This circuit is entirely the same as the circuit shown in FIG. 1, except that each of the bidirectional switches 6 shown in FIG. 1 is substituted with a switching device 6e and a diode 6f connected in inverse parallel therewith. If the voltage of the storage battery 5 is always higher than the output voltage of the current source rectifier 2, the voltage $V_{sw}$ applied to each of the switches (6e+6f) is always positive (for the polarity of the voltage, see the arrow shown in FIG. 5). In such a case, the same circuit operation as that in the circuit shown in FIG. 1 becomes possible. Thus, the bidirectional switches 6 shown in FIG. 1 can be simplified.

Figure 6:
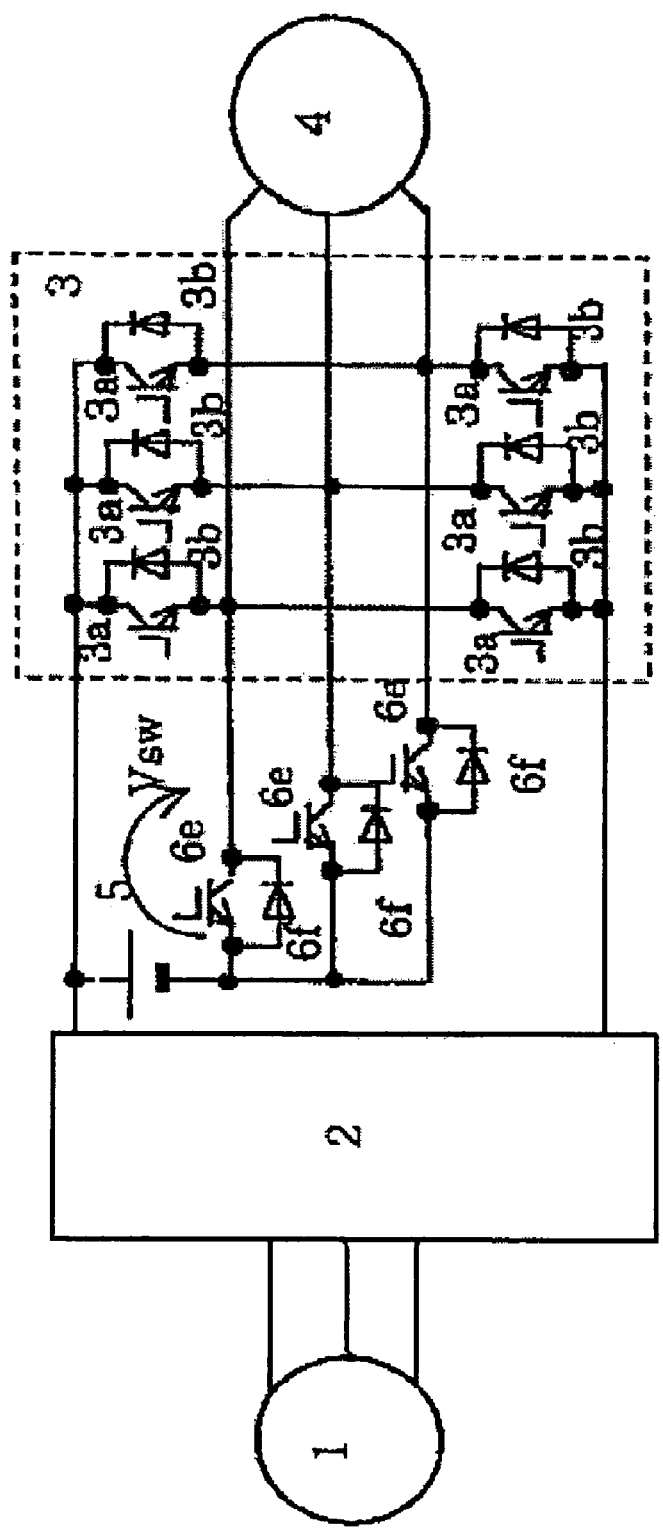
FIG. 6 is a circuit diagram showing an example of a further modification of the AC motor driving circuit shown in FIG. 4.

FIG. 6 is a circuit diagram showing an example of a further modification of the AC motor driving circuit shown in FIG. 4. The circuit of FIG. 6 is entirely the same as the driving circuit shown in FIG. 4, except that each of the bidirectional switches 6 shown in FIG. 4 is substituted with a switching device 6e and a diode 6f connected in inverse parallel therewith. If the voltage of the storage battery 5 is always higher than the output voltage of the current source rectifier 2, the voltage $V_{sw}$ applied to each of the switches (6e+6f) is always positive (for the polarity of the voltage, see the arrow shown in FIG. 6). In such a case, the same circuit operation as that in the circuit shown in FIG. 4 becomes possible. Thus, the bidirectional switches 6 shown in FIG. 4 can be simplified.

Figure 7:
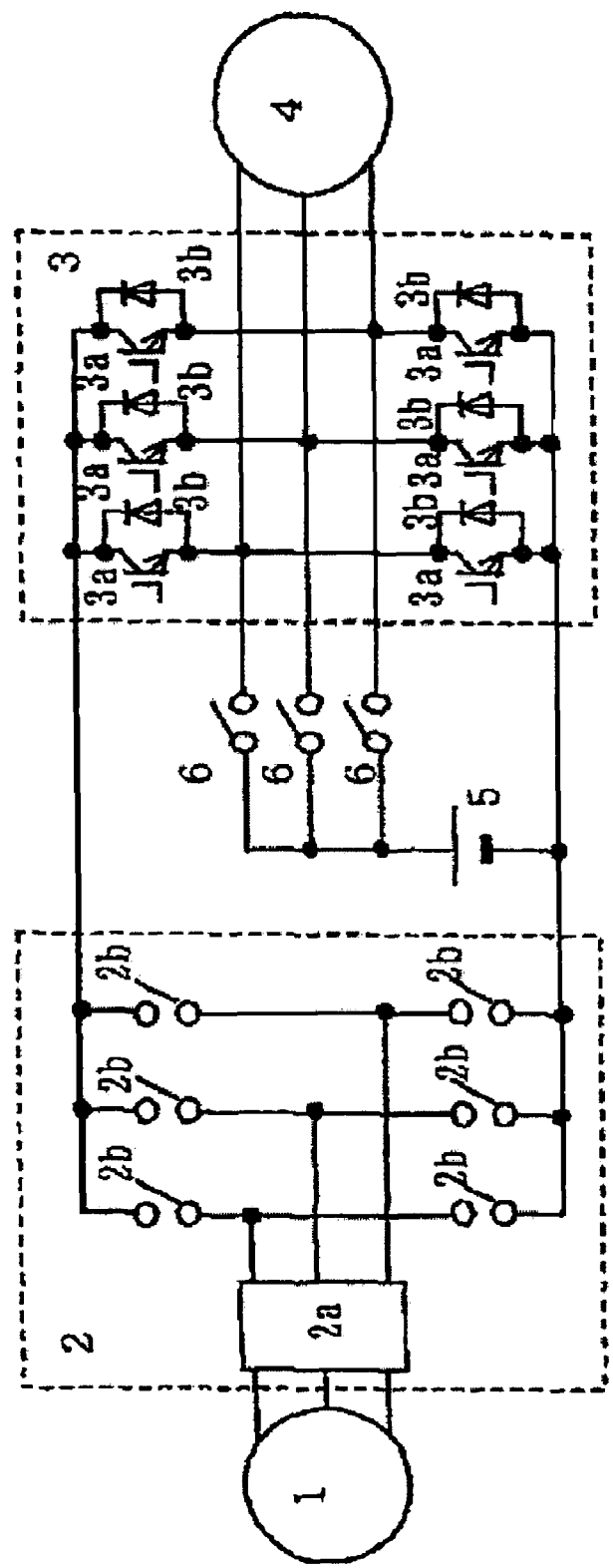
FIG. 7 is a circuit diagram showing an example of a third modification of the AC motor driving circuit shown in FIG. 1.
Figure 8:
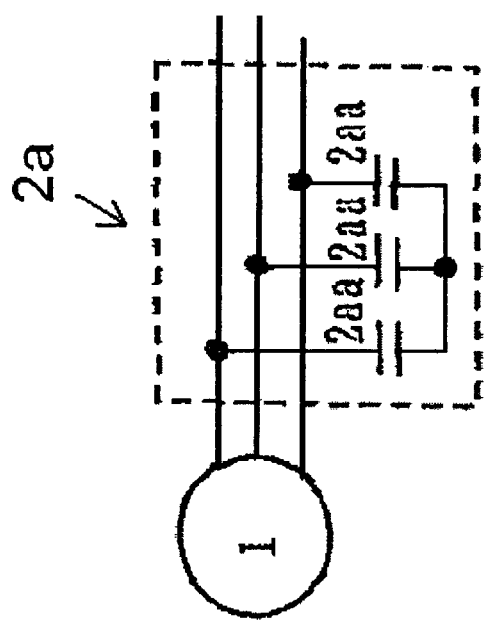
FIG. 8 is a circuit diagram showing a specific example of a filter circuit shown in FIG. 7.

FIG. 7 is a circuit diagram showing an example of a third modification of the AC motor driving circuit shown in FIG. 1. This circuit is characterized in that, in the circuit shown in FIG. 1, the current source rectifier 2 is formed with a filter circuit 2a provided on the AC input side and, along with this, with the bidirectional switches 2b connected as the arms of a bridge circuit. The filter circuit 2a can be actualized as, for example, an LC filter making use of internal inductance of the AC generator 1 with capacitors 2aa provided in star connection as shown in FIG. 8. Moreover, the actualization of the bidirectional switch 2b becomes possible by using the circuit shown in FIG. 2 or FIG. 3 like the bidirectional switch 6, for example.

Figure 9:
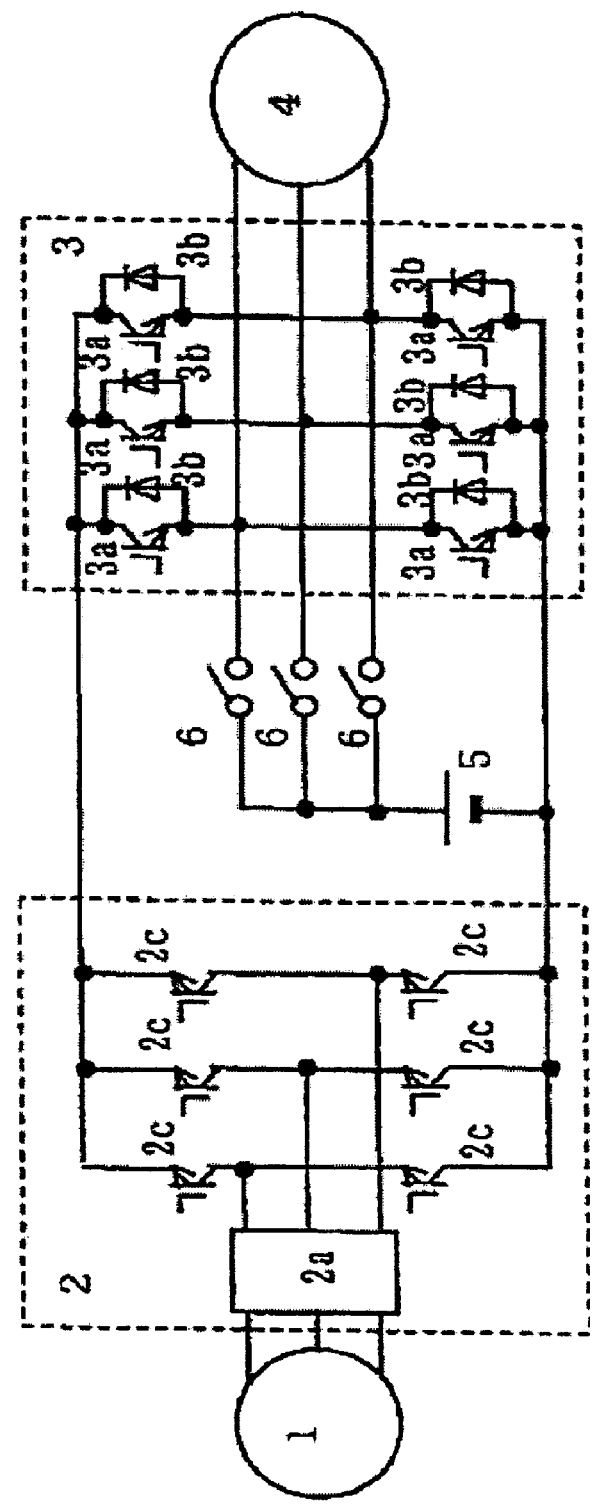
FIG. 9 is a circuit diagram showing an example of a further modification of the AC motor driving circuit shown in FIG. 7.

FIG. 9 is a circuit diagram showing an example of a further modification of the AC motor driving circuit shown in FIG. 7. This is a circuit in which each of the bidirectional switches 2b shown in FIG. 7 is substituted with a one-way switch 2c having reverse blocking ability. Here, for the switch 2c, a device having reverse blocking ability in itself is selected. The device, alternatively, can be formed with a switching device having no reverse blocking ability in itself and a diode connected in series.

Figure 10:
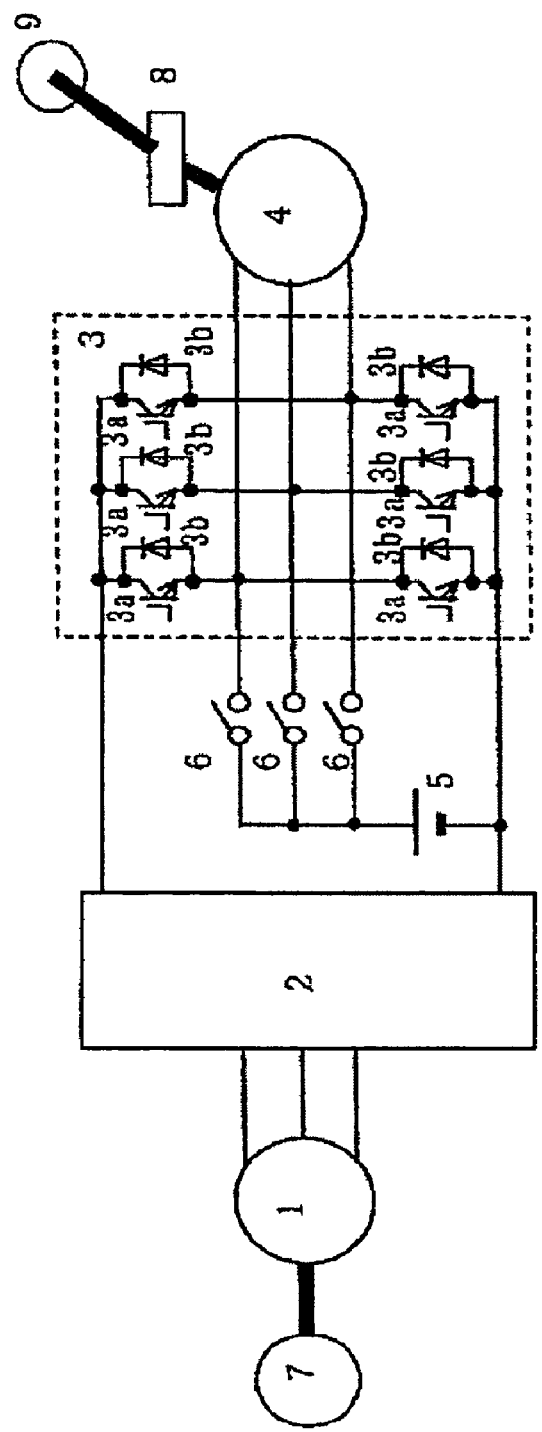
FIG. 10 is a diagram showing an example of an application of the AC motor driving circuit shown in FIG. 1.
Figure 11:
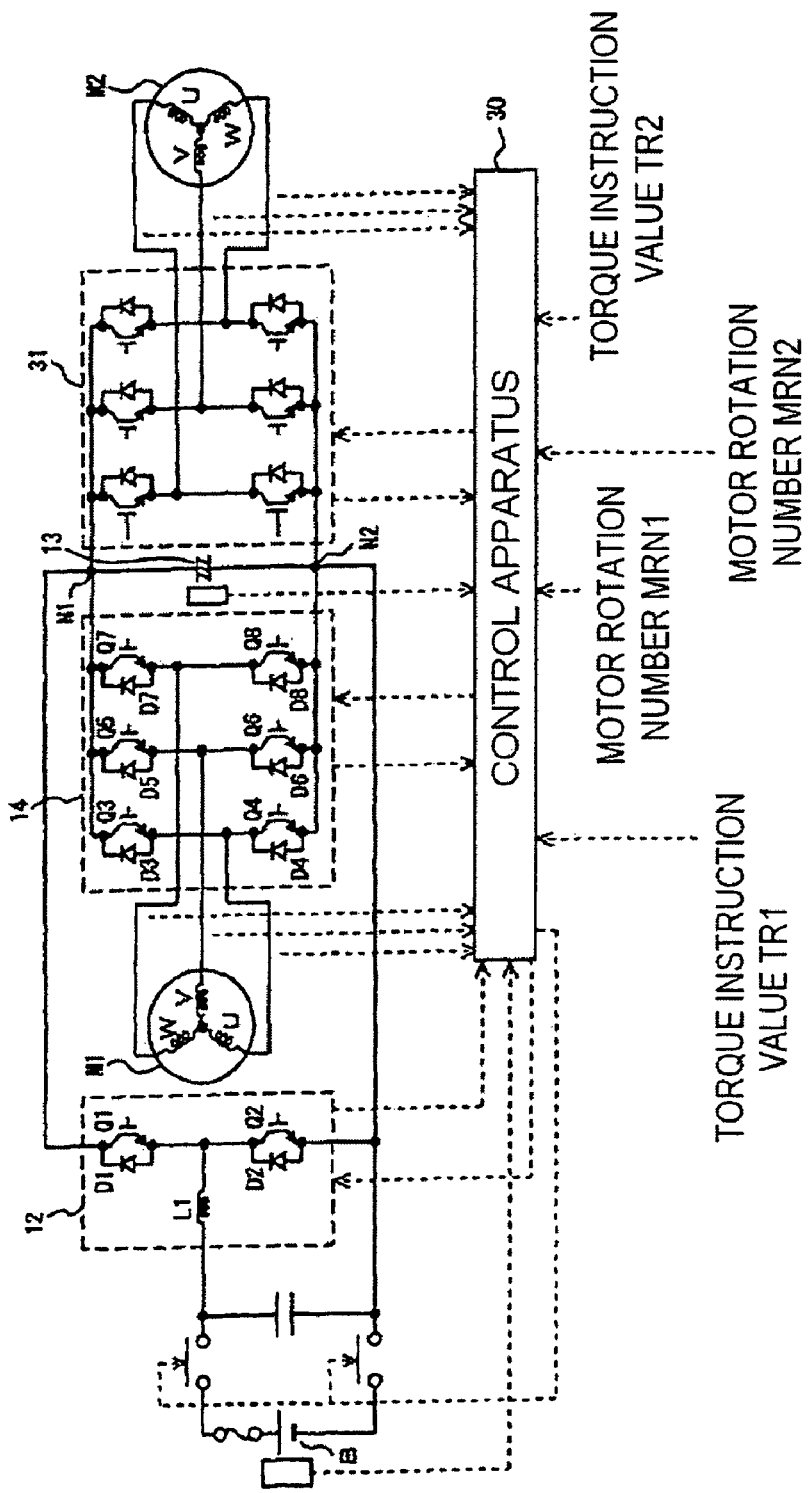
FIG. 11 is a circuit diagram showing a first example of a related AC motor driving circuit.
Figure 12:
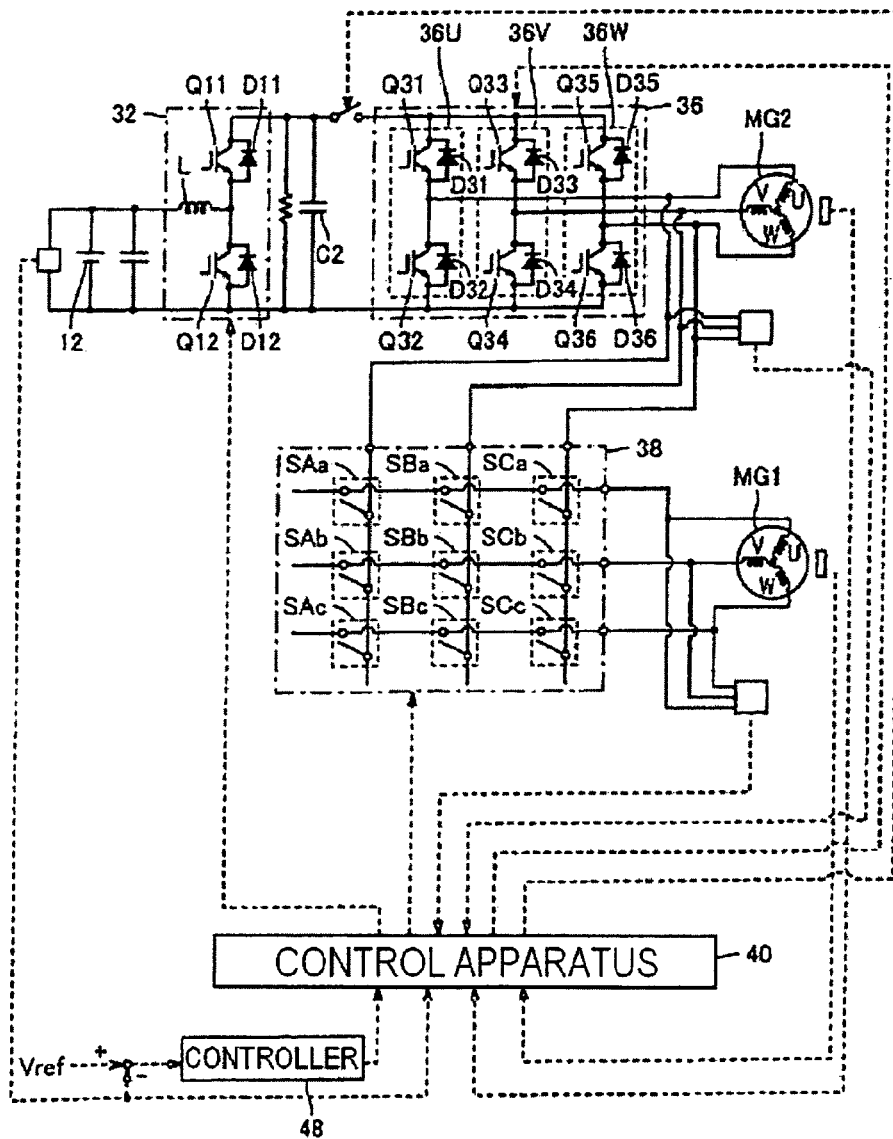
FIG. 12 is a circuit diagram showing a second example of a related AC motor driving circuit.

FIG. 10 is a diagram showing an example of an application of the AC motor driving circuit shown in FIG. 1. In this example, to the AC motor driving circuit shown in FIG. 1, an internal combustion engine 7 is additionally provided to be mechanically coupled to the AC generator 1. Moreover, by connecting the output shaft of the AC motor 4 to wheels 9 through gears 8, the AC motor driving circuit is provided as an electric vehicle driving circuit. The internal combustion engine 7 can be of course applied to the circuits shown in FIGS. 4 to 7 and FIG. 9.

While the present invention has been particularly shown and described with reference to the preferred embodiment thereof, it will be understood by those skilled in the art that the foregoing and other changes in form and details can be made therein without departing from the spirit and scope of the invention.

What is claimed is:

1. An AC motor driving circuit comprising:
   a current source rectifier having an AC input;
   a voltage source inverter having a DC input, provided between said current source rectifier and an AC motor, through which inverter the AC motor is connected to the output side of said current source rectifier; and
   a plurality of switches each with one of the terminals thereof connected to the corresponding output terminal of said voltage source inverter,
   wherein the other terminals of said plurality of switches are lumped together to be connected to one of two terminals of a DC power source, and the other of the two terminals of the DC power source is connected to one of the DC input terminals of said voltage source inverter.

2. The AC motor driving circuit of claim 1, wherein said current source rectifier includes a plurality of bidirectional switches connected as arms of a bridge circuit, an AC input side of said current source rectifier including a filter circuit.

3. The AC motor driving circuit of claim 1, wherein said current source rectifier includes a plurality of unidirectional switches each having a reverse blocking capability connected as arms of a bridge circuit, an AC input side of said current source rectifier including a filter circuit.

4. An electric vehicle driving circuit using the AC motor driving circuit as in claim 1, further comprising:
   an AC generator configured to supply the AC input, and
   an internal combustion engine configured to drive the AC generator.

5. The AC motor driving circuit of claim 1, wherein said plurality of switches includes a plurality of bidirectional switches.

6. The AC motor driving circuit of claim 5, wherein each of said bidirectional switches includes a switching device and a diode in inverse-parallel connection therewith.

7. The AC motor driving circuit of claim 6, wherein said current source rectifier is formed with a plurality of bidirectional switches connected as arms of a bridge circuit, an AC input side of said current source rectifier including.

8. The AC motor driving circuit of claim 6, wherein said current source rectifier includes a plurality of unidirectional switches each having a reverse blocking capability connected as arms of a bridge circuit, an AC input side of said current source rectifier including a filter circuit.

9. The AC motor driving circuit of claim 5, wherein said current source rectifier includes a plurality of bidirectional switches connected as arms of a bridge circuit, an AC input side of said current source rectifier including a filter circuit.

10. The AC motor driving circuit of claim 5, wherein said current source rectifier includes a plurality of unidirectional switches each having a reverse blocking capability connected as arms of a bridge circuit, and is provided with a filter circuit on the AC input side.

* * * * *